(12) United States Patent
Chang (10) Patent No.: US 11,981,468 B2
(45) Date of Patent: May 14, 2024

(54) PLASTIC THREAD BONDING METHOD AND STRUCTURE FOR FOLDING EDGE OF FLEXIBLE INTERMEDIATE BULK CONTAINERS

(71) Applicant: HON BOUW CO., LTD., Taichung (TW)

(72) Inventor: Pao-Chung Chang, Taichung (TW)

(73) Assignee: HON BOUW CO., LTD., Taichung (TW)

( * ) Notice: Subject to any disclaimer, the term of this patent is extended or adjusted under 35 U.S.C. 154(b) by 16 days.

(21) Appl. No.: 17/297,983

(22) PCT Filed: May 19, 2020

(86) PCT No.: PCT/CN2020/090944
§ 371 (c)(1),
(2) Date: May 27, 2021

(87) PCT Pub. No.: WO2021/232214
PCT Pub. Date: Nov. 25, 2021

(65) Prior Publication Data
US 2023/0068617 A1  Mar. 2, 2023

(51) Int. Cl.
*B29C 65/40* (2006.01)
*B29C 65/62* (2006.01)
*B65B 51/07* (2006.01)

(52) U.S. Cl.
CPC .............. *B65B 51/07* (2013.01); *B29C 65/40* (2013.01); *B29C 65/62* (2013.01)

(58) Field of Classification Search
CPC ........ B31B 70/68; B65B 51/07; B29C 65/40; B29C 65/62

USPC .............................................. 156/93
See application file for complete search history.

(56) References Cited

U.S. PATENT DOCUMENTS

| 4,190,156 A | 2/1980 | Adam |
| 2011/0274921 A1* | 11/2011 | Li ............................ B32B 7/12 156/227 |

FOREIGN PATENT DOCUMENTS

| CN | 101168385 A | 4/2008 |
| CN | 201761099 U | 3/2011 |
| CN | 102616497 A | 8/2012 |
| IN | 108545345 A | 9/2018 |

(Continued)

*Primary Examiner* — James D Sells
(74) *Attorney, Agent, or Firm* — PAI PATENT & TRADEMARK LAW FIRM; Chao-Chang David Pai (57) ABSTRACT

A plastic thread bonding method and structure for folding edge of a FIBC includes setting the folding edge of the FIBC flatly on a metal solid surface; using a cooling device to maintain a condensation temperature of the solid surface; performing a needle insertion action of the folding edge by a plastic injection needle, and condensing and crystallizing at the eyelet to form a base point; performing a needle withdrawal action by the plastic injection needle to fill up a melted plastic into the eyelet, applying a pressurized cold air to condense the melted plastic to from a thread post; performing a horizontal translation action of the plastic injection needle or the folding edge, and applying the pressurized cold air to condense the melted plastic to form a thread bridge; and repeating the aforementioned procedure to form a next base point, a next thread post and a thread bridge.

10 Claims, 9 Drawing Sheets

(56) References Cited

FOREIGN PATENT DOCUMENTS

| JP | H5-337269 A | 12/1993 |
|----|-------------|---------|
| JP | 3187079 U | 11/2013 |

* cited by examiner

FIG. 1

PRIOR ART

PLASTIC THREAD BONDING METHOD AND STRUCTURE FOR FOLDING EDGE OF FLEXIBLE INTERMEDIATE BULK CONTAINERS

TECHNICAL FIELD

The present invention relates to the field of flexible freight containers, in particular to a method and structure for bonding a folding edge of a flexible intermediate bulk container (FIBC) such as a bulk bag or a ton bag.

BACKGROUND TECHNOLOGY

Flexible Immediate Bulk Container (also known as FIBC bulk bag or ton bag) is a flexible freight container with the features of large volume, light weight, and easy-to-load/unload. For example, FIBC transportation can be realized by a crane or a forklift and is widely used in the transportation and packaging of bulk materials.

FIBC is mainly composed of a raw material polypropylene (PP) mixed with a small amount of stable materials. The mixture is melt and extruded into plastic films by an extruder, cut into filaments, and stretched, and then PP precursor filaments with high strength and low rate of elongation are manufactured by thermosetting, and then woven and laminated into bag fabrics, and finally sewed with accessories such as straps to form the FIBC.

Figure 1:
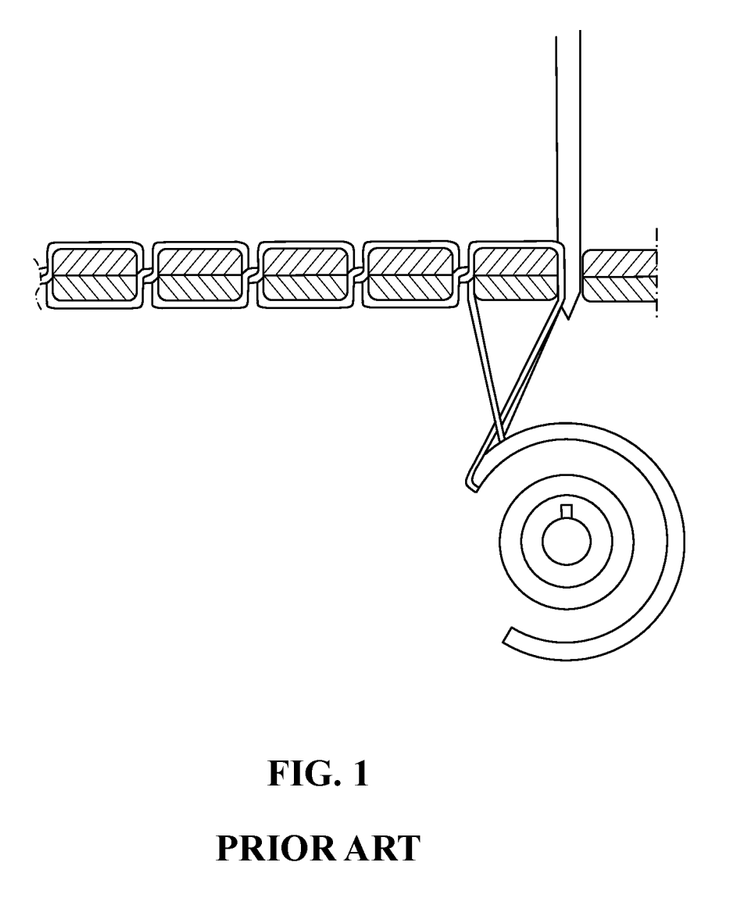
FIG. 1 is a schematic view of a conventional FIBC sewed structure.

When the FIBC is produced and manufactured, it is necessary to sew the folding edge of a bag fabric to ensure the integrity and strength of the FIBC. In FIG. 1, the folding edge is sewed with a cotton thread by a sewing machine. A reciprocating needle head 1 of the sewing machine cooperates with the linear movement of the folding edge of the bag fabric to sew one or more sewed structures. In a microscopic view, the sewed structure includes an eyelet 2, a top thread 3 and a bottom thread 4 passing through the eyelet 2 and vertically cross-linked with each other, and an upper chain line 5 and a lower chain line 6 formed on a surface of the bag fabric.

FIG. 1 further discloses the general sewing conditions. For example, the diameter of the eyelet is greater than the diameter of the cotton thread, so that a gap is formed between the eyelet and the cotton thread that gives rise to a powder leakage issue of the FIBC easily, and the traditional way of solving this problem of this method is to provide an additional leakproof structure or adds a leakproof inner bag in the FIBC, thus increasing the complexity of the production. In addition, the eyelet creates a piercing damage to the structure of the FIBC, but the cotton thread is unable to compensate this damage. The thicker the thread used, the larger the diameter of the eyelet and the higher the level of the piercing damage. Since the cotton thread and the eyelet are arranged in a straight line, therefore a continuous unstable structure of the FIBC is formed. If the FIBC carrying a heavy object is hung and moved during transportation, the eyelet will become increasing larger due to the weight of the FIBC bag which may leads to breakage and damage. Further, the cotton thread and the FIBC are made of different materials, so that when the FIBC is discarded for recycling, it is very difficult to remove the stitches. The way of cutting the folding edge will cause troubles in the recycling process.

CONTENT OF INVENTION

In view of the aforementioned problems, the present invention provides a novel plastic thread bonding method and structure for a folding edge of a FIBC to solve the problems of the prior art.

The plastic thread bonding method for a folding edge of a FIBC in accordance with the present invention includes the following steps:

Step 1: Set the folding edge of the FIBC flatly on a metal solid surface; and use a cooling device to maintain a condensation temperature at the solid surface.

Step 2: Perform a needle insertion action at a site of the folding edge connected to a plastic injection needle of an injection molding machine, and the needle insertion action pierces the plastic injection needle through the folding edge to form an eyelet, and the plastic injection needle injects a melted plastic from a needle tip of the plastic injection needle, and the melted plastic is cooled instantly when touching the solid surface, and solidified and crystallized at the position of the eyelet corresponsive to the bottom surface of the folding edge to form a base point, wherein the base point has a range greater than that of the diameter of the eyelet Step 3: Perform a needle withdrawal action of the plastic injection needle to separate the plastic injection needle from the eyelet, wherein the needle withdrawal action is performed in a direction opposite to that of the needle insertion action; continue to inject the melted plastic from the needle tip while performing the needle withdrawal action, so that the eyelet is filled up with the melted plastic, while a pressurized cold air is being applied from an upper surface of the folding edge to the eyelet; instantly cool and condense the melted plastic filled in the eyelet to form a thread post by the cooling effect of the pressurized cold air, wherein the thread post, the folding edge, and the base point are condensed into one piece.

Step 4: Perform a horizontal translation action of the plastic injection needle or the folding edge through a distance, continue to inject the melted plastic onto the upper surface of the folding edge while the needle tip is moving and continue to supply the pressurized cold air, so that the melted plastic is condensed instantly to form a thread bridge, and the thread bridge and the upper surface of the folding edge are condensed into one piece.

Step 5: Repeat the Steps 2 to 4, wherein the needle insertion action of the Step 2, the needle withdrawal action of Step 3, and the horizontal translation action of the Step 4 are performed at a next site of the folding edge to form a next base point, a next thread post, and a next thread bridge; and the plurality of base points, thread posts, and continuous thread bridges disposed along the folding edge form a plastic thread bonding structure with a high strength and low rate of elongation.

A plastic thread bonding structure for a folding edge of a FIBC in accordance with the present invention includes:
- a folding edge of the FIBC;
- a plurality of base points, disposed along the length of the folding edge and condensed equidistantly on a bottom surface of the folding edge;
- a plurality of thread posts, penetrating and condensed in the interior of the folding edge, and the bottom end of one of the thread posts being condensed with one of the base points into one piece; and
- a plurality of thread bridges, condensed with a top surface of the folding edge, wherein both ends of each of the thread bridges are condensed with the top ends of two adjacent thread posts into one piece.

Compared with the prior art, the present invention has the following advantageous effects:

In the method of this invention, the melted plastic is condensed to form the aforementioned plastic thread bonding structure, which is further bonded with a folding edge of the FIBC. Since the selected plastic is the same as the plastic of the FIBC, therefore the plastic thread bonding structure has high strength and low rate of elongation, and this structure not just can bond the folding edge together only, but also can fuse with the folding edge as well, so as to achieve the effects of improving the tightness significantly, preventing the plastic thread bonding structure from being easily separated from the folding edge, and maintaining the fixity for a long time.

The base points, thread posts, and continuous thread bridges enable the plastic thread bonding structure to be kept on the folding edge stably without being broken easily. Even if a local breaking point occurs occasionally, the overall fixation and tightness will not be affected.

Although the aforementioned needle insertion action forms the eyelets along the folding edge, the eyelets are filled up with the melted plastic to form the thread posts immediately, and the thread posts are completely filled in the eyelets and bonded with the contact surface of the folding edge, so that the thread posts completely compensate the eyelets, and the plastic thread bonding structure becomes an eyelet-free structure. When the FIBC carries powders, no powder will be leaked from the plastic thread bonding structure. When the FIBC is deformed by hoisting a heavy load, the plastic thread bonding structure with the high strength and low rate of elongation improves the structural strength of the folding edge and reduces the chance of deformation or breakage significantly.

Since the plastic thread bonding structure and the FIBC are made of the same material, therefore the whole of FIBC can be recycled as a plastic waste to reduce the hassle of recycling.

The method and structure of the present invention are not just applied to FIBC only, but also can be applied to bond other plastic bags as well.

DESCRIPTION OF NUMERALS USED IN THE DRAWINGS

10: Solid surface; 11: Cooling device; 20: Plastic injection needle; 21: Needle tip; 22: Pressurized cold air; 23: presser foot; 30: Plastic thread bonding structure; 31: Base point; 32: Thread post; 33: Thread bridge; 40: FIBC; 41: Folding edge.

Specific Embodiment

To facilitate the description of the major idea expressed in the aforementioned technical contents of the invention, exemplary embodiments are illustrated in reference with the drawings. It is noteworthy that various objects shown in the figures are drawn according to the proportion, size, deformation, or displacement suitable for explanation rather than drawn according to the actual proportion, size, deformation or displacement of the objects. Elements with the same and symmetrical configuration are presented by their respective numerals in the figures. The figures are intended for illustrating the method of the invention only, but not for implicitly or explicitly limiting the shape, structure or orientation of devices or elements of the invention, so that the embodiments and figures disclosed herein are to be considered illustrative rather than restrictive.

Figure 2:
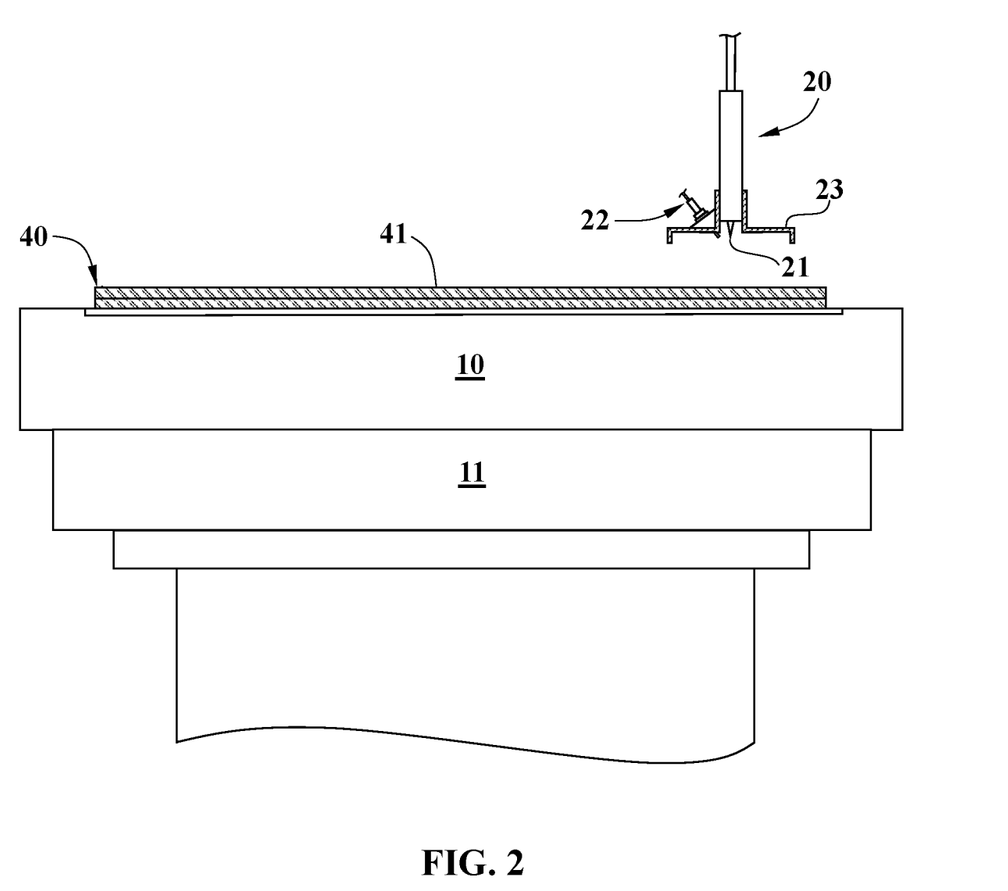
FIG. 2 is a schematic view of a mechanism of a plastic thread sewed structure of the present invention.

The plastic thread bonding method for a folding edge 41 of a FIBC 40 in accordance with the present invention includes the following steps:

Step 1 (as shown in FIG. 2): Set a folding edge 41 of a FIBC 40 flatly on a metal solid surface 10; use a cooling device 11 to maintain a condensation temperature at the solid surface 10, wherein the condensation temperature has a range from 5° C. to 20° C., and preferably 5° C.

Figure 3:
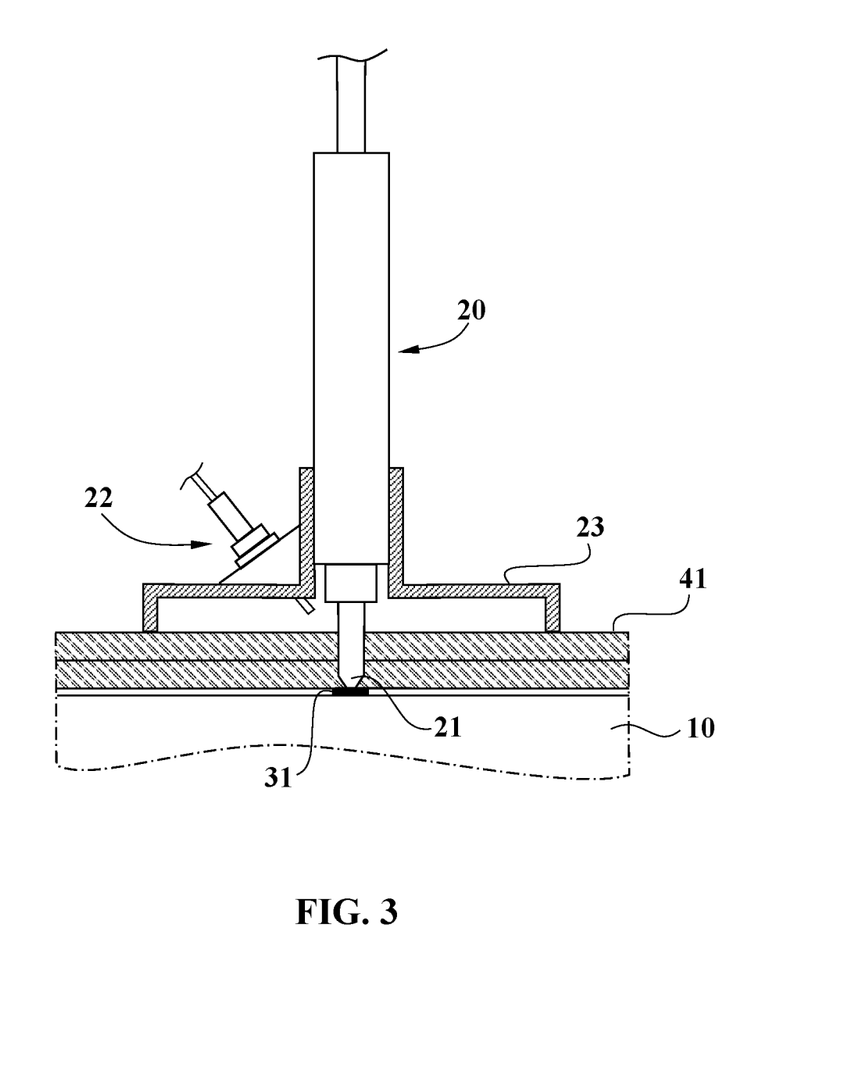
FIG. 3 is a first schematic view showing the movement of a plastic thread bonding method for a folding edge of a FIBC in accordance with the present invention.

Step 2 (as shown in FIG. 3): Perform a needle insertion action at a site of the folding edge 41 by a plastic injection needle 20 which is connected to an injection molding machine, wherein the needle insertion action pierces the plastic injection needle 20 through the folding edge 41 to form an eyelet; use the plastic injection needle 20 of the injection molding machine to inject a melted plastic out from a needle tip 21 of the plastic injection needle 20 continuously, and the melted plastic is situated at a melting point temperature (up to 160° C.~190° C.), and will be cooled instantly when touching the solid surface 10 of a low temperature, and solidified and crystallized at the bottom surface which is configured to be corresponsive to the eyelet of the folding edge 41 to form a base point 31. The melted plastic is the same as the plastic used for making the FIBC 40, which includes but not limited to polypropylene (PP) or High Density Polyethylene (HDPE). The melting point temperature of PP is 165° C., and the melting point temperature of HDPE is from 125° C. to 135° C. Based on the same selected material, the base point 31 and the bottom surface of the folding edge 41 can be condensed into one piece, but will not be fixed onto the metal solid surface 10.

Figure 4:
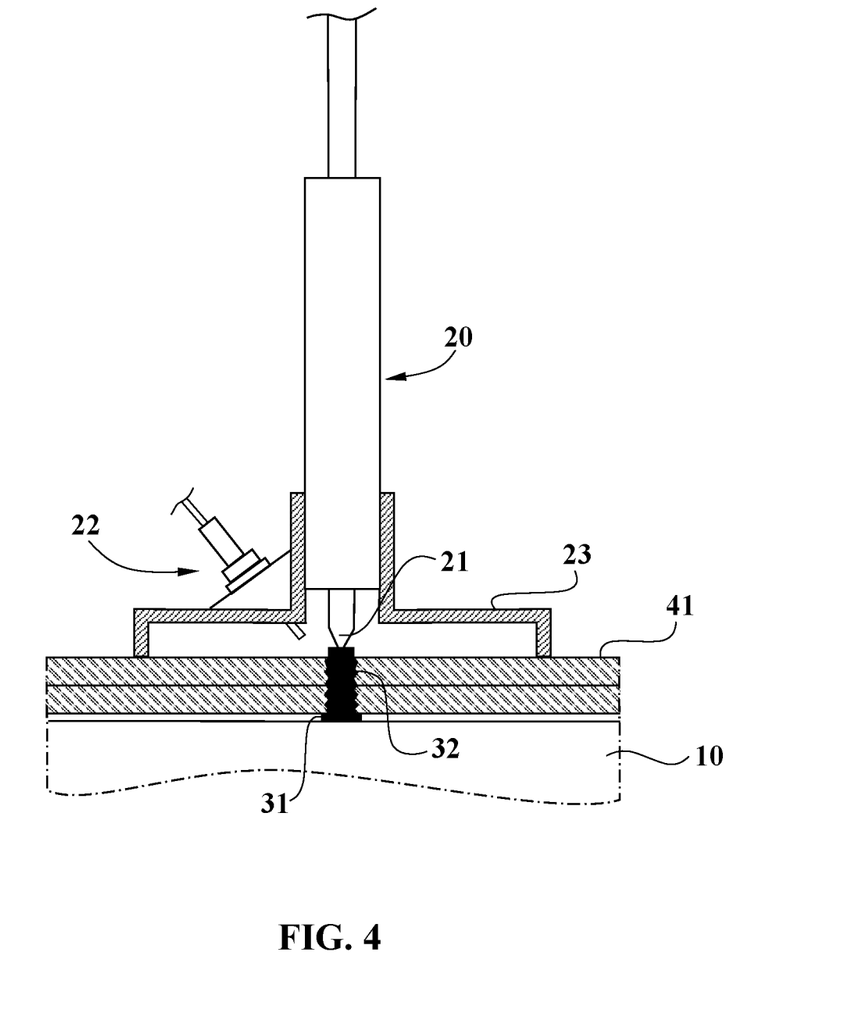
FIG. 4 is a second schematic view showing the movement of a plastic thread bonding method for a folding edge of a FIBC in accordance with the present invention.

Step 3 (as shown in FIG. 4): Perform a needle withdrawal action by the plastic injection needle 20 to separate the plastic injection needle 20 from the eyelet, wherein the needle tip 21 continues injecting the melted plastic, so that the eyelet is filled up with the melted plastic during the needle withdrawal action, while a pressurized cold air 22 is being applied from an upper surface of the folding edge 41 to the eyelet, wherein the temperature of the pressurized cold air 22 is from 5° C. to 20° C.; the melted plastic filled up in the eyelet is cooled and condensed immediately to form a thread post 32 by the cooling effect of the pressurized cold air 22, and the contact surface between the thread post 32 and the folding edge 41 and the base point 31 are condensed into one piece. Based on the needle withdrawal action and the injection pressure, the contact surface between the thread post 32 and the folding edge 41 is condensed into a rough blurred form, and the eyelet is filled up with the thread posts 32 and bonded tightly with the contact surface of the folding edge 41, so that the eyelet is totally gap-free.

Figure 5:
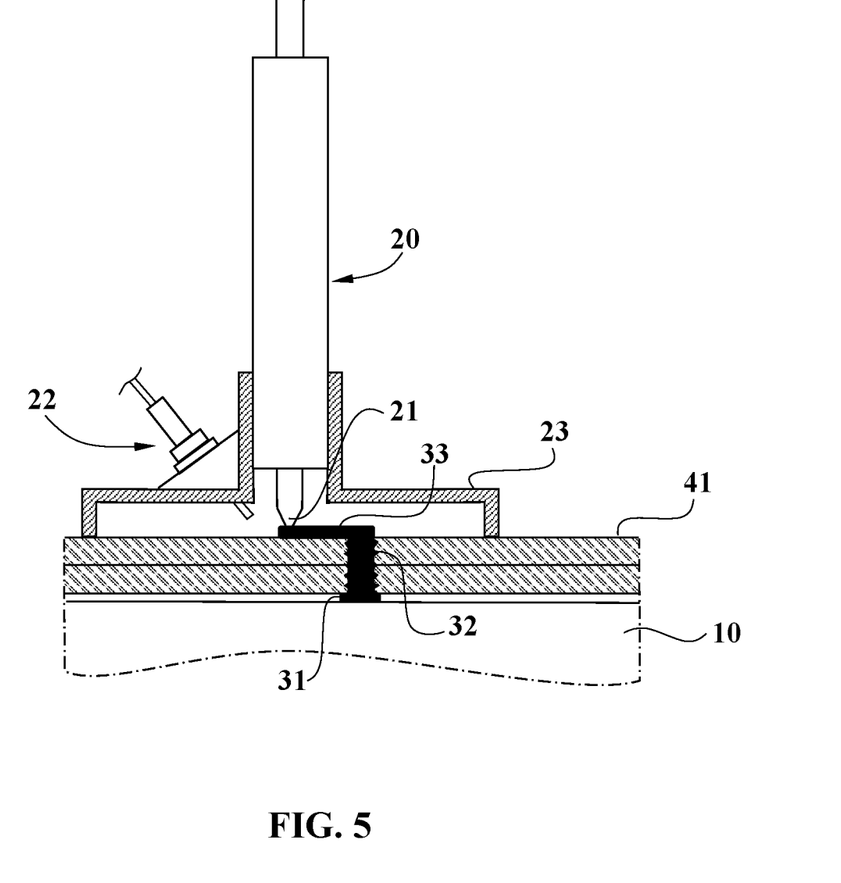
FIG. 5 is a third schematic view showing the movement of a plastic thread bonding method for a folding edge of a FIBC in accordance with the present invention.

Step 4 (as shown in FIG. 5): Perform a horizontal translation action of the plastic injection needle 20 through a distance parallel to the upper surface of the folding edge 41, and this action can be substitute by the movement of the folding edge 41. Preferably, the distance is greater than the range of the base point 31. Specifically, the distance is equal to 2~3 times of the diameter of the plastic injection needle 20, and the distance data range is 1 mm~3 mm. The moving distance can be adjusted according to actual needs, and the present invention is not limited by the specific data or proportion provided in this specification. During the movement, the needle tip 21 still continues injecting the melted plastic and providing the pressurized cold air 22, so that the melted plastic can be condensed into a thread bridge 33 instantly, and the thread bridge 33 and the upper surface of the folding edge 41 are condensed into one piece.

Figure 6:
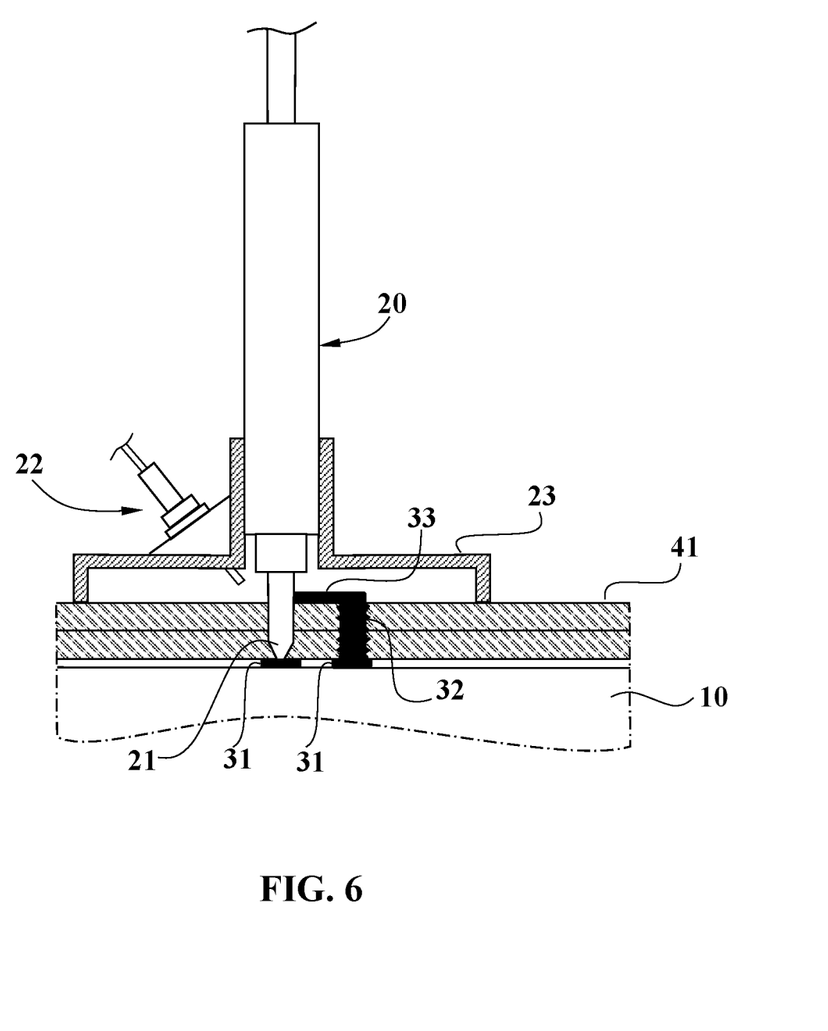
FIG. 6 is a fourth schematic view showing the movement of a plastic thread bonding method for a folding edge of a FIBC in accordance with the present invention.
Figure 7:
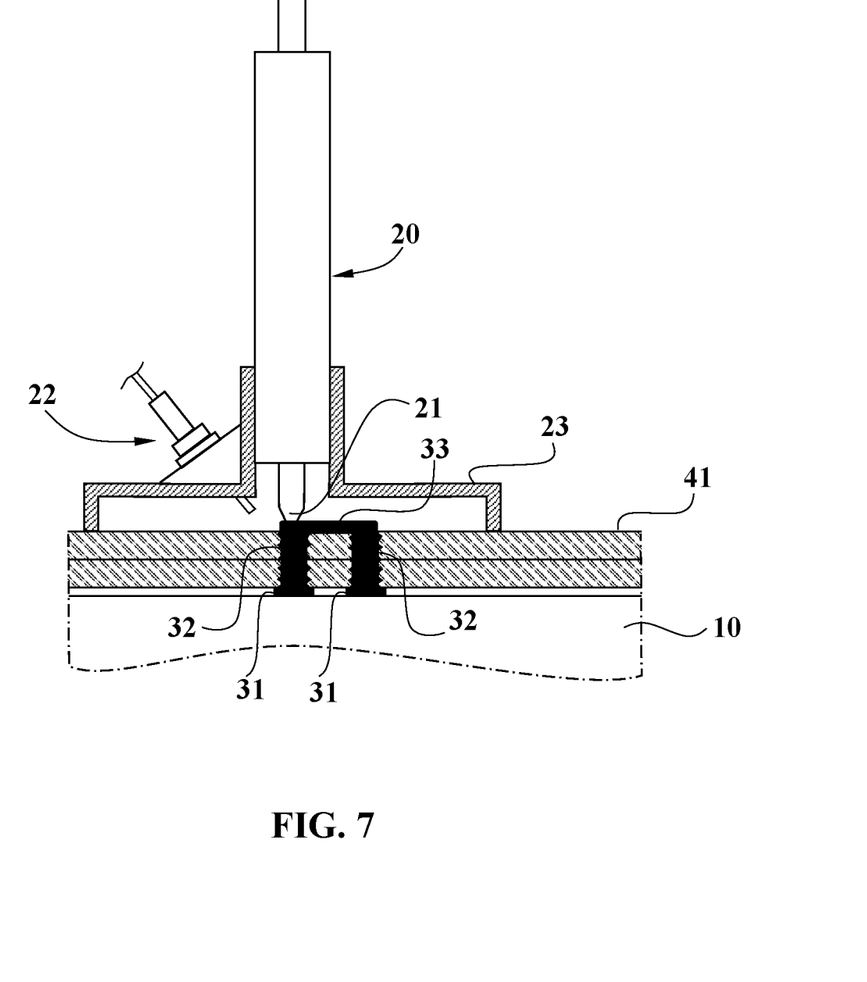
FIG. 7 is a fifth schematic view showing the movement of a plastic thread bonding method for a folding edge of a FIBC in accordance with the present invention.
Figure 8:
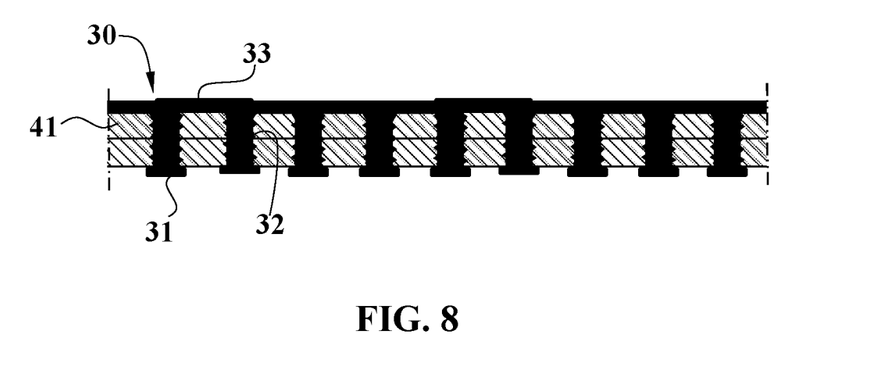
FIG. 8 is a cross-sectional view of a plastic thread sewed structure of a folding edge of a FIBC in accordance with the present invention.

Step 5 (as shown in FIGS. 6, 7, and 8): Repeat Steps 2 to 4. Perform the needle insertion action of Step 2, the needle withdrawal action of Step 3, and the horizontal translation action of Step 4 for the next site of the folding edge 41 to form a next base point 31, a thread post 32, and a thread bridge 33 respectively. The plurality of base points 31, thread posts 32, and continuous thread bridges 33 form a plastic thread bonding structure 30 with a high strength and a low rate of elongation along the folding edge 41.

The technical characteristics of this invention are described in detail below:

The speed for the needle insertion action and needle withdrawal action is set according to the thickness of the folding edge 41 of the FIBC 40, and the specific action time for the needle insertion and withdrawal has a range from 0.1 to 1 second. In principle, the larger the thickness of the folding edge 41, the lower the speed of the actions. For example, the speed for the needle insertion action and the needle withdrawal action is set to 0.1 second for the folding edge 41 with a thickness of 1 mm.

The melted plastic passing through the needle tip 21 has a mass flow rate of 10 kg/h~20 kg/h. In principle, the lower the speed of the needle insertion action and the needle withdrawal action speed, the smaller the mass flow rate.

The metal solid surface 10 is preferably made by a stainless steel sheet. The method of maintaining the condensation temperature includes but not limited to water cooling and electric cooling.

The position for sewing the plastic thread to the folding edge 41 should be pressed by a presser foot 23 to maintain the plastic thread smooth and flat without being pulled or moved by the plastic injection needle 20.

The plastic injection needle 20 pierces through the folding edge 41 by its needle tip 21, and the needle tip 21 has a taper, so that the eyelet formed in the interior of the folding edge 41 and the thread post 32 may be in a conical shape (in a microscopic view).

Figure 9:
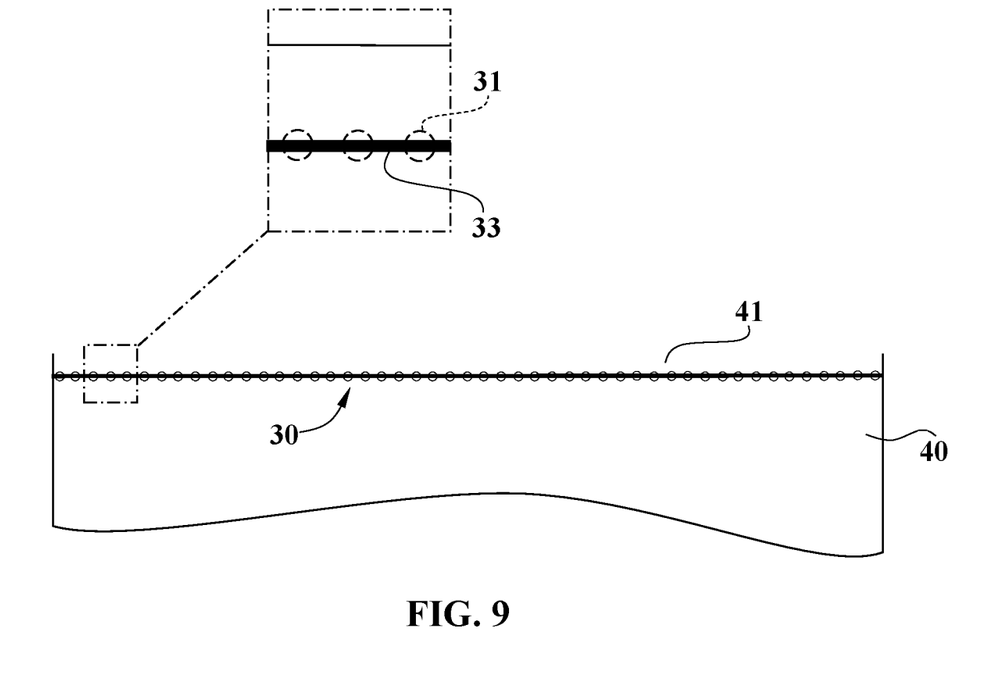
FIG. 9 shows a top view of a plastic thread sewed structure of a folding edge of a FIBC in accordance with a first embodiment of the present invention, and a partial blowup view of the selected portion of the top view.

In FIG. 9, the plastic thread bonding structure 30 formed according to the aforementioned procedure by a single needle head is of a single linear type.

Figure 10:
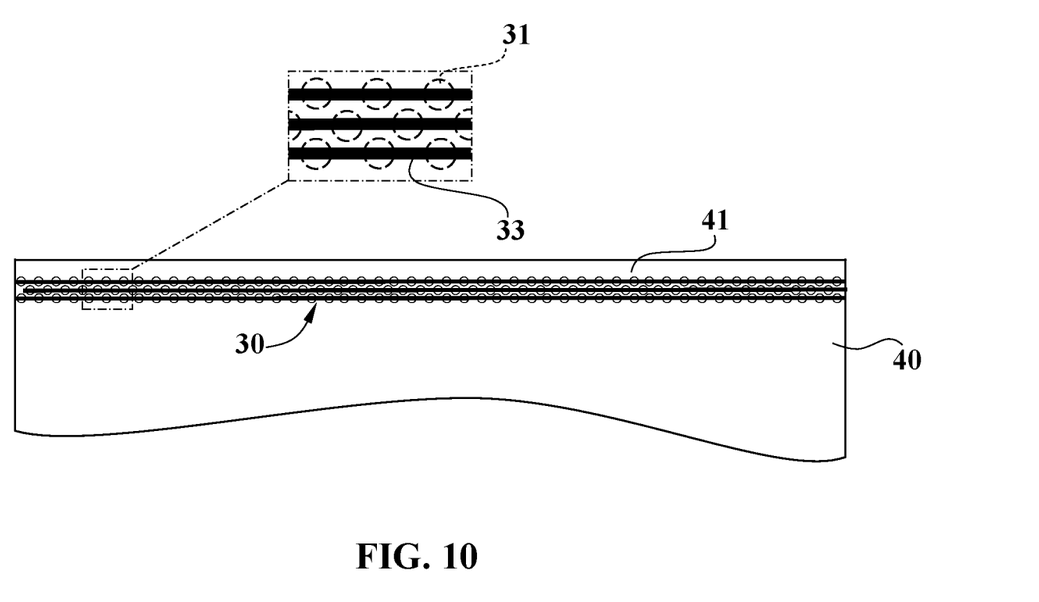
FIG. 10 shows a top view of a plastic thread sewed structure of a folding edge of a FIBC in accordance with a second embodiment of the present invention, and a partial blowup view of the selected portion of the top view.

In FIG. 10, the plastic thread bonding structure 30 formed according to the aforementioned procedure by a plurality of needle heads, or sequentially and reciprocally by a single needle head is of a multiple linear type. Preferably, the base point 31 and the thread post 32 of one of the plastic thread bonding structures 30 are adjacent and corresponsive to the thread bridge 33 of another one of the plastic thread bonding structures 30.

In the present invention, the aforementioned method can be achieved by the reciprocating movement of the plastic injection needle 20 relative to the folding edge 41, or an opposite change can be made accordingly to achieve the same effect by the reciprocating movement of the plastic injection needle 20 relative to the solid surface 10 and the folding edge 41.

The invention claimed is:

1. A plastic thread bonding method for a folding edge of a FIBC, comprising the steps of:
   (Step 1) setting the folding edge of the FIBC flatly on a metal solid surface; and using a cooling device to maintain a condensation temperature at the solid surface;
   (Step 2) performing a needle insertion action at a site of the folding edge coupled to a plastic injection needle of an injection molding machine, and the needle insertion action piercing the plastic injection needle through the folding edge to form an eyelet, and the plastic injection needle injecting a melted plastic from a needle tip of the plastic injection needle, and the melted plastic being cooled instantly when touching the solid surface, and solidified and crystallized at the position of the eyelet corresponsive to the bottom surface of the folding edge to form a base point, wherein the base point has a range greater than that of the diameter of the eyelet;
   (Step 3) performing a needle withdrawal action of the plastic injection needle to separate the plastic injection needle from the eyelet, and the needle withdrawal action being performed in a direction opposite to that of the needle insertion action; continuing to inject the melted plastic from the needle tip while performing the needle withdrawal action, so that the eyelet is filled up with the melted plastic, while a pressurized cold air is being applied from an upper surface of the folding edge to the eyelet; cooling and condensing the melted plastic filled in the eyelet instantly to form a thread post by the cooling effect of the pressurized cold air, and the thread post, the folding edge, and the base point are condensed into one piece;
   (Step 4) performing a horizontal translation action of the plastic injection needle or the folding edge through a distance, continuing to inject the melted plastic onto the upper surface of the folding edge while the needle tip is moving and continuing to supply the pressurized cold air, so that the melted plastic is condensed instantly to form a thread bridge, and the thread bridge and the upper surface of the folding edge are condensed into one piece; and
   (Step 5) repeating the Steps 2 to 4, wherein the needle insertion action of the Step 2, the needle withdrawal action of Step 3, and the horizontal translation action of the Step 4 are performed at a next site of the folding edge to form a next base point, a next thread post, and a next thread bridge; and the plurality of base points, thread posts, and continuous thread bridges disposed along the folding edge form a plastic thread bonding structure with a high strength and low rate of elongation.

2. The plastic thread bonding method for a folding edge of a FIBC as claimed in claim 1, wherein the condensation temperature has a range from 5° C. to 20° C.

3. The plastic thread bonding method for a folding edge of a FIBC as claimed in claim 1, wherein the melted plastic is the same plastic for manufacturing the FIBC.

4. The plastic thread bonding method for a folding edge of a FIBC as claimed in claim 1, wherein the pressurized cold air has a temperature range from 5° C. to 20° C.

5. The plastic thread bonding method for a folding edge of a FIBC as claimed in claim 1, wherein the distance is 1 mm~3 mm.

6. The plastic thread bonding method for a folding edge of a FIBC as claimed in claim 1, wherein the melted plastic passing through the needle tip has a mass flow rate of 10 kg/h~20 kg/h.

7. A plastic thread bonding structure for a folding edge of a FIBC, comprising:
- the folding edge of the FIBC;
- a plurality of base points disposed along the length of the folding edge and equidistantly condensed on a bottom surface of the folding edge;
- a plurality of thread posts, penetrating and condensed in the interior of the folding edge, and a bottom end of one of the thread posts and one of the base points being condensed into one piece;
- a plurality of thread bridges, condensed on a top surface of the folding edge, and both ends of each of the thread bridges being condensed with the top ends of two adjacent thread posts respectively into one piece.

8. The plastic thread bonding structure for a folding edge of a FIBC as claimed in claim 7, wherein the plastic thread bonding structure is of a single linear type.

9. The plastic thread bonding structure for a folding edge of a FIBC as claimed in claim 7, wherein the plastic thread bonding structure is of a multiple linear type.

10. The plastic thread bonding structure for a folding edge of a FIBC as claimed in claim 9, wherein the base point and the thread post of one of the plastic thread bonding structure are adjacent and corresponsive to the thread bridge of another one of the plastic thread bonding structures.

* * * * *